United States Patent
Karasawa et al.

(10) Patent No.: US 12,280,616 B2
(45) Date of Patent: Apr. 22, 2025

(54) PNEUMATIC TIRE

(71) Applicant: BRIDGESTONE CORPORATION, Tokyo (JP)

(72) Inventors: Mayuko Karasawa, Tokyo (JP); Kai Yamada, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 73 days.

(21) Appl. No.: 18/264,580

(22) PCT Filed: Nov. 5, 2021

(86) PCT No.: PCT/JP2021/040889
§ 371 (c)(1),
(2) Date: Aug. 8, 2023

(87) PCT Pub. No.: WO2022/185618
PCT Pub. Date: Sep. 9, 2022

(65) Prior Publication Data
US 2024/0109373 A1    Apr. 4, 2024

(30) Foreign Application Priority Data
Mar. 1, 2021  (JP) .................................. 2021-032170

(51) Int. Cl.
*B60C 11/11*   (2006.01)
*B60C 11/03*   (2006.01)
(Continued)

(52) U.S. Cl.
CPC ...... *B60C 11/0309* (2013.01); *B60C 11/1204* (2013.01); *B60C 11/1315* (2013.01); *B60C 2011/013* (2013.01); *B60C 2011/0346* (2013.01)

(58) Field of Classification Search
CPC ..... B60C 11/11; B60C 11/13; B60C 11/1307; B60C 11/1376
See application file for complete search history.

(56) References Cited

U.S. PATENT DOCUMENTS

| | | | |
|---|---|---|---|
| 4,796,683 | A | 1/1989 | Kawabata et al. |
| 7,114,540 | B2 | 10/2006 | Miyazaki |
| 2005/0092413 | A1 | 5/2005 | Miyazaki |

(Continued)

FOREIGN PATENT DOCUMENTS

| | | |
|---|---|---|
| JP | S62255203 A | 11/1987 |
| JP | H11192818 A | 7/1999 |

(Continued)

OTHER PUBLICATIONS

Dec. 7, 2021, International Search Report issued in the International Patent Application No. PCT/JP2021/040889.

(Continued)

*Primary Examiner* — Cedrick S Williams
(74) *Attorney, Agent, or Firm* — KENJA IP LAW PC

(57) ABSTRACT

A pneumatic tire that includes a tread surface 1 including: two or more main grooves 3; and a pair of middle block rows 22, wherein one or more first middle blocks in the plurality of middle blocks each have a middle block inclined side wall surface 223 that faces an outer main groove in the pair of outer main grooves and that gradually inclines inwards in a tire radial direction as the middle block inclined side wall surface extends outwards in the tire width direction, and the middle block inclined side wall surface forms an acute angle θ223 of 30° to 50° with respect to a normal of the tread surface at an inner end in the tire width direction of the middle block inclined side wall surface.

16 Claims, 6 Drawing Sheets

(51) Int. Cl.
    *B60C 11/12*      (2006.01)
    *B60C 11/13*      (2006.01)
    *B60C 11/01*      (2006.01)

(56) References Cited

U.S. PATENT DOCUMENTS

| | | |
|---|---|---|
| 2012/0152421 A1 | 6/2012 | Stuckey |
| 2016/0272010 A1 | 9/2016 | Washizuka et al. |
| 2018/0072103 A1 | 3/2018 | Vantal et al. |
| 2020/0156416 A1 | 5/2020 | Ito et al. |

FOREIGN PATENT DOCUMENTS

| | | |
|---|---|---|
| JP | 2001138713 A | 5/2001 |
| JP | 2005132239 A | 5/2005 |
| JP | 2005161921 A | 6/2005 |
| JP | 2007055334 A | 3/2007 |
| JP | 2008049730 A | 3/2008 |
| JP | 2009023601 A | 2/2009 |
| JP | 2013249014 A | 12/2013 |
| JP | 2015089796 A | 5/2015 |
| JP | 2020082904 A | 6/2020 |
| JP | 2020152269 A | 9/2020 |

OTHER PUBLICATIONS

Aug. 29, 2023, International Preliminary Report on Patentability issued in the International Patent Application No. PCT/JP2021/040889.

May 15, 2024, search result of the Extended European Search Report issued by the European Patent Office in the corresponding European Patent Application No. 21929178.8.

PNEUMATIC TIRE

TECHNICAL FIELD

The present disclosure relates to a pneumatic tire.

This application claims priority to Japanese Patent Application No. 2021-032170 filed on Mar. 1, 2021, the entire contents of which are incorporated herein by reference.

BACKGROUND

A conventional pneumatic tire includes a tread surface having block rows located adjacent to and inwards in a tire width direction of main grooves in four main grooves that are positioned on the outermost sides in the tire width direction (for example, Patent Literature 1).

CITATION LIST

Patent Literature

PTL 1: JP 2001-138713 A

SUMMARY

Technical Problem

According to the conventional technology, however, there is room for improvement in traction performance.

It would be helpful to provide a pneumatic tire that can improve traction performance.

Solution to Problem

A pneumatic tire according to the present disclosure is a pneumatic tire including
a tread surface including:
two or more main grooves; and
a pair of middle block rows located adjacent to and inwards in a tire width direction of a pair of outer main grooves in the two or more main grooves that are positioned on outermost sides in the tire width direction, wherein
each middle block row in the pair of middle block rows includes a plurality of middle blocks arranged along a tire circumferential direction,
one or more first middle blocks in the plurality of middle blocks each have a middle block inclined side wall surface that faces an outer main groove in the pair of outer main grooves and that gradually inclines inwards in a tire radial direction as the middle block inclined side wall surface extends outwards in the tire width direction, and
the middle block inclined side wall surface forms an acute angle of 30° to 50° with respect to a normal of the tread surface at an inner end in the tire width direction of the middle block inclined side wall surface.

Advantageous Effect

According to the present disclosure, a pneumatic tire that can improve traction performance is provided.

DETAILED DESCRIPTION

A pneumatic tire according to the present disclosure can be used as any type of pneumatic tire, and it can be suitably used as a pneumatic tire for passenger vehicles, and more suitably used as a pneumatic tire for all-season passenger vehicles.

In the following, an embodiment of the pneumatic tire according to the present disclosure will be illustrated with reference to the drawings.

Figure 1:
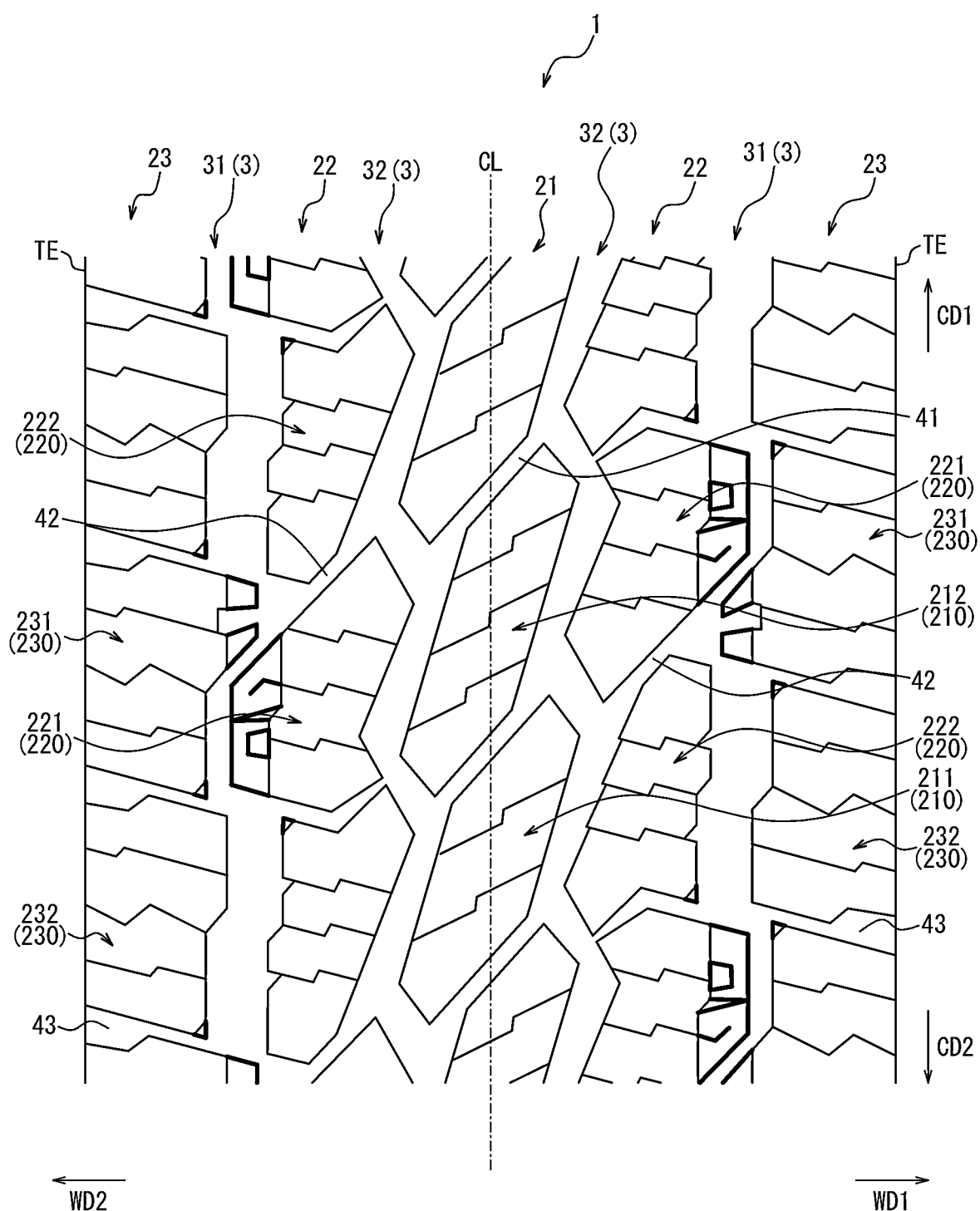
FIG. 1 is a developed plan view schematically illustrating a tread surface of a pneumatic tire according to an embodiment of the present disclosure.
Figure 2:
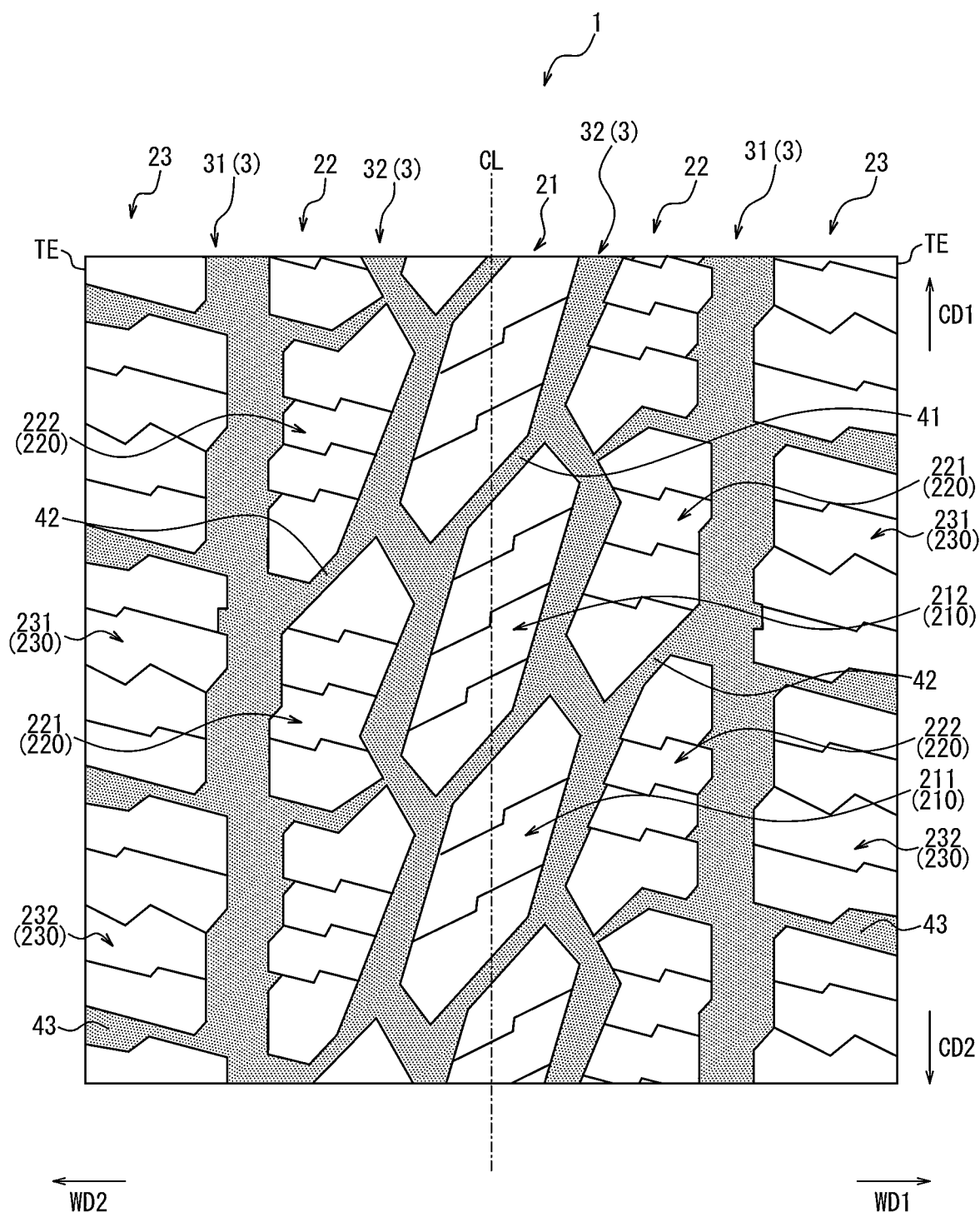
FIG. 2 is a plan view wherein some portions of the pneumatic tire of FIG. 1 that are depressed inwards in a tire radial direction from the tread surface are indicated by dotted hatching.

FIGS. 1 to 6 illustrate a tread surface 1 of the pneumatic tire according to the embodiment of the present disclosure. In addition to the tread surface 1, FIG. 1 and FIGS. 3 to 6 also illustrate portions (groove wall surfaces, groove bottom surfaces, or the like) that are depressed inwards in a tire radial direction from the tread surface 1. FIG. 2 illustrates only the tread surface 1, and the dotted hatching indicates some portions (groove wall surfaces, groove bottom surfaces, or the like) that are depressed inwards in the tire radial direction from the tread surface 1.

Herein, the pneumatic tire is also referred to simply as "tire."

Herein, the "tread surface (1)" refers to an outer peripheral surface around the entire circumference of the tire that comes into contact with a road surface when the tire is rolled under the maximum load after it has been mounted on a rim and filled to a predetermined internal pressure.

Herein, "ground contact ends (TE1, TE2)" refer to ends in a tire width direction of the tread surface (1).

Herein, a "ground contact width" refers to the distance in the tire width direction between the pair of ground contact ends of the tread surface (1).

Herein, the "rim" refers to a standard rim (which is called a measuring rim in STANDARDS MANUAL of the European Tyre and Rim Technical Organisation [ETRTO], and a design rim in YEAR BOOK of the Tire and Rim Association, Inc. [TRA]) of an applicable size that is described or will be described in industrial standards valid for a region in which the tire is produced or used. Examples of the industrial standards include JATMA YEAR BOOK of the Japan Automobile Tyre Manufacturers Association (JATMA) in Japan, STANDARDS MANUAL of the ETRTO in Europe, and YEAR BOOK of the TRA in the United States of America (that is, the "rim" includes any size currently included and any size which will be possibly included in the industrial standards. Examples of the "size which will be described" include those described as "Future Developments" in the ETRTO STANDARDS MANUAL 2013). As for sizes not described in the industrial standards, the "rim" refers to a rim having a width corresponding to the bead width of the tire.

Moreover, the "predetermined internal pressure" refers to an air pressure (maximum air pressure) corresponding to the maximum load capability of a single wheel of an applicable size/ply rating specified by JATMA YEAR BOOK or the like. As for sizes not described in the industrial standards, the "predetermined internal pressure" refers to an air pressure (maximum air pressure) corresponding to the maximum load capability determined depending on a vehicle to which the tire is mounted.

The "maximum load" refers to a load corresponding to the maximum load capacity described above.

Additionally, air herein can be replaced by inert gas, such as nitrogen gas, or another type of gas.

Herein, unless otherwise specified, the dimensions of elements, such as grooves, sipes, or blocks are measured in a later-described "reference state." The "reference state" refers to a state in which the tire is mounted on a rim, filled to the predetermined internal pressure, subjected to no load. Herein, the dimensions of elements, such as grooves, sipes, or blocks on the tread surface are measured in a developed view of the tread surface. Herein, the "developed view of the tread surface" refers to a plan view of the tread face in a state in which the tread surface is developed into a plane.

Herein, the "grooves" refer to grooves having a width of 1.3 mm or more on the tread surface in the aforementioned reference state. In the present embodiment, main grooves 3, center lateral grooves 41, and lug grooves 42 to 44 are provided as the grooves. The grooves preferably has a groove width of 1.5 mm or more. The "groove width" is the distance between a pair of opposing groove wall surfaces when measured perpendicularly to the direction of extension of the groove, and it may be constant or non-constant in the tire radial direction. Each "groove" is preferably configured so that when the tire is mounted on a rim, filled to the predetermined internal pressure, and subjected to the maximum load, the pair of opposing groove wall surfaces right under the load do not contact each other. The grooves have a groove depth of preferably 3 to 20 mm, and more preferably 3 to 11 mm.

Herein, the "sipes" refer to sipes having a sipe width of less than 1.3 mm on the tread surface in the aforementioned reference state. In the present embodiment, center block sipes 210S, middle block sipes 220S, and shoulder block sipes 230S are provided as the sipes. The sipes have a sipe width of preferably 1.0 mm or less, and more preferably 0.8 mm or less. The "sipe width" is the distance between a pair of opposing sipe wall surfaces when measured perpendicularly to the direction of extension of the sipe. Each "sipe" is preferably configured so that when the tire is mounted to a rim, filled to the predetermined internal pressure, and subjected to the maximum load, the pair of opposing sipe wall surfaces right under the load are at least partially in contact with each other. The sipes have a sipe depth of preferably 3 to 20 mm, and more preferably 3 to 11 mm.

Herein, for the sake of convenience, one side in a tire circumferential direction (the upper side in FIG. 1) is referred to as "first side CD1 in the tire circumferential direction," and another side in the tire circumferential direction (the lower side in FIG. 1) is referred to as "second side CD2 in the tire circumferential direction."

Similarly, for the sake of convenience, one side in the tire width direction (the right side in FIG. 1) is referred to as "first side WD1 in the tire width direction," and another side in the tire width direction (the left side in FIG. 1) is referred to as "second side WD2 in the tire width direction" herein.

As illustrated in FIGS. 1 and 2, the tire according to the present embodiment includes two or more main grooves 3 on the tread surface 1. Each main groove 3 extends continuously in the tire circumferential direction. The two or more main grooves 3 include a pair of outer main grooves 31, which are positioned on the outermost sides in the tire width direction, and a pair of inner main grooves 32, which are positioned inwards in the tire width direction of the pair of outer main grooves 31. The pair of inner main grooves 32 are not situated on a tire equatorial plane CL and are positioned on both sides of the tire equatorial plane CL. However, any one of the inner main grooves 32 may be positioned on the tire equatorial plane CL.

The number of main grooves 3 is preferably four or more as in the present embodiment (four in the present embodiment), but it may also be two or three.

The groove depth of the main grooves 3 is preferably 6 to 20 mm, and more preferably 7 to 11 mm.

The tire according to the present embodiment includes a center block row 21, a pair of middle block rows 22, and a pair of shoulder block rows 23 on the tread surface 1. These will be described below in order.

Figure 3:
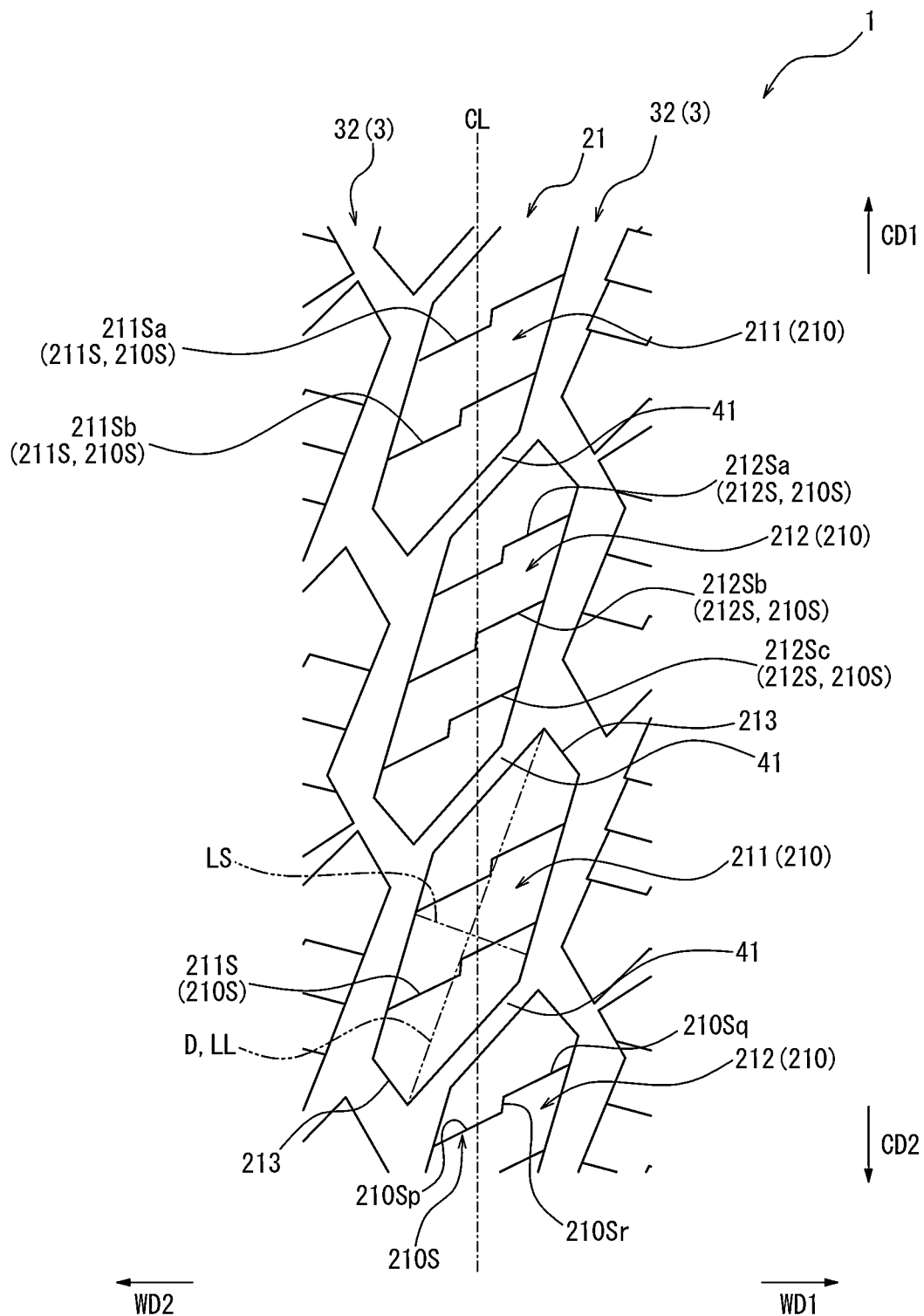
FIG. 3 is a plan view schematically illustrating part of the tread surface of FIG. 1.
Figure 4:
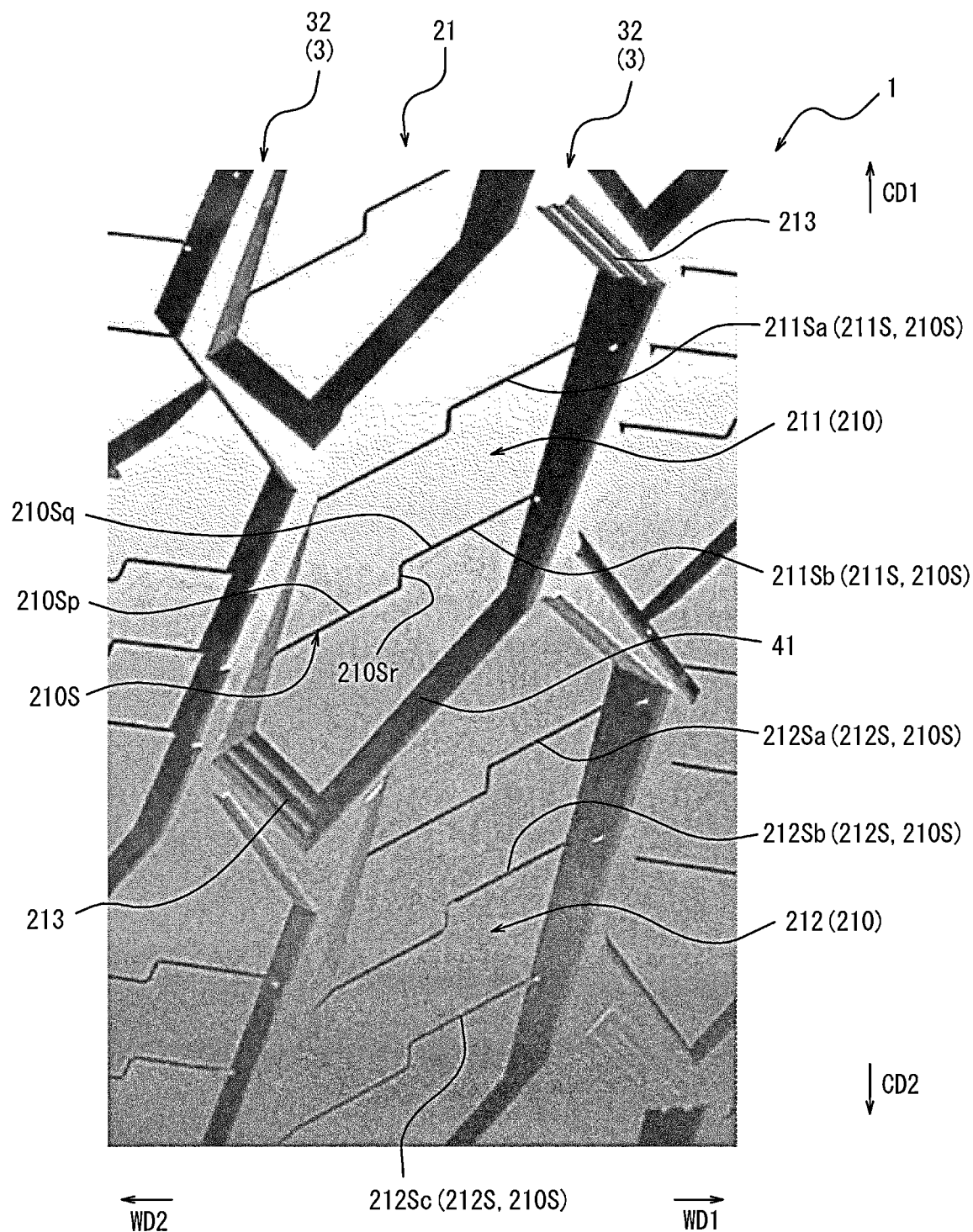
FIG. 4 is a perspective view illustrating part of the tread surface of FIG. 3 in an enlarged manner.

First, with reference to FIGS. 1 to 4, the center block row 21 will be described. FIGS. 3 and 4 illustrate the center block row 21 in an enlarged manner.

The center block row 21 is provided in a center area of the tread surface 1.

The "center area" refers to an area of the tread surface 1 that is centered on the tire equatorial plane CL and that has a width in the tire width direction of 50% of the ground contact width. On the other hand, "shoulder areas" refer to a pair of areas of the tread surface 1 that are positioned outwards in the tire width direction of the center area.

It is sufficient for the center block row 21 to be at least partially positioned within the center area, but preferably the entire center block row 21 is located within the center area, as in the present embodiment of FIGS. 1 and 2. Furthermore, the center block row 21 is preferably positioned on the tire equatorial plane CL as in the present embodiment, but it does not need not be positioned on the tire equatorial plane CL.

The center block row 21 is defined between the pair of inner main grooves 32.

Each inner main groove 32 extends in a zigzag shape. This improves traction performance and drainage performance.

The center block row 21 has a plurality of center blocks 210 arranged along the tire circumferential direction. The plurality of center blocks 210 are divided by center lateral grooves 41. The plurality of center lateral grooves 41 are arranged along the tire circumferential direction. Although in the present embodiment the center lateral grooves 41 are positioned on the tire equatorial plane CL, the center lateral grooves 41 do not need not be positioned on the tire equatorial plane CL. Each center lateral groove 41 extends in relation to the tire width direction and the tire radial direction, and specifically, it extends more toward the first side CD1 in the tire circumferential direction as it extends more toward the first side WD1 in the tire width direction.

The plurality of center blocks 210 constituting the center block row 21 includes a plurality of types of center blocks 210, specifically, a plurality of first center blocks 211 and a plurality of second center blocks 212. More specifically, in the present embodiment, the plurality of center blocks 210 constituting the center block row 21 includes only two types of center blocks 210, that is, the first center blocks 211 and the second center blocks 212. However, the plurality of center blocks 210 constituting the center block row 21 may include three or more types of center blocks 210.

As illustrated in FIG. 2, the first center blocks 211 and the second center blocks 212 have polygonal shapes on the tread surface 1. Here, the shape formed by each center block 210 (each first center block 211, each second center block 212, or the like) on the tread surface 1 refers to a shape formed by the outermost surface in the tire radial direction of the center block 210 in a developed view of the tread surface 1.

On the tread surface 1, the polygonal shape formed by each second center block 212 has the same number of sides as, but a different shape than, the polygonal shape formed by each first center block 211. More specifically, the polygonal shape formed by any second center block 212 has the same number of sides as, but a different shape than, the polygonal shape formed by any first center block 211. Here, having "different shapes" means that they are non-congruent and dissimilar.

The polygonal shapes formed by the respective first center blocks 211 on the tread surface 1 may be congruent or substantially congruent. Similarly, the polygonal shapes formed by the respective second center blocks 212 on the tread surface 1 may be congruent or substantially congruent.

Thus, according to the present embodiment, because the shape of each first center block 211 and the shape of each second center block 212 have the same number of sides, they have similar shapes compared to a case in which they have different numbers of sides. This can equalize ground contact pressure along the tire circumferential direction during rolling of the tire, and thus, wear resistance performance can be improved.

Furthermore, according to the present embodiment, because the shape of each first center block 211 and the shape of each second center block 212 are different, the frequencies of noise generated during rolling of the tire can be offset from one another compared to a case in which their shapes are the same, and thus, noise reduction performance can be improved.

Moreover, according to the present embodiment, because the first center blocks 211 and the second center blocks 212 have polygonal shapes, it is easier to arrange the center blocks 210 in the center block row 21 such that they are at equal spacing, compared to a case in which they have non-polygonal shapes, such as circular shapes. This can equalize ground contact pressure during rolling of the tire, and thus, wear resistance performance can be improved.

As illustrated in FIGS. 3 and 4, each center block 210 (and thus each first center block 211 and each second center block 212) includes one or more center block sipes (sipes) 210S. Herein, the center block sipes 210S included in the first center block 211 are referred to as "first center block sipes 211S," and the center block sipes 210S included in the second center block 212 are referred to as "second center block sipes 212S."

The number n of second center block sipes 212S included in each second center block 212 is greater than the number m of first center block sipes 211S included in each first center block 211. Additionally, each first center block 211 has the same number m of first center block sipes 211S. Similarly, each second center block 212 has the same number n of second center block sipes 212S.

In the present embodiment, a plurality of first center block sipes 211S are arranged along the tire circumferential direction in each first center block 211. The number m of first center block sipes 211S included in each first center block 211 is two. Similarly, a plurality of second center block sipes 212S are arranged along the tire circumferential direction in each second center block 212. The number n of second center block sipes 212S included in each second center block 212 is three.

According to the present embodiment, because each center block 210 (and thus each first center block 211 and each second center block 212) includes one or more center block sipes (sipes) 210S, edges can be increased compared to a case in which it does not have sipes, and thus, both traction performance and steering stability performance on dry road surfaces can be better achieved.

Furthermore, according to the present embodiment, because the number n of second center block sipes 212S included in each second center block 212 is greater than the number m of first center block sipes 211S included in each first center block 211, that is, they are different, the frequencies of noise generated during rolling of the tire can be offset from one another compared to a case in which they were the same, and thus, noise reduction performance can be improved.

As described above, according to the pneumatic tire of the present embodiment, both noise reduction performance and wear resistance performance can be better achieved.

On the tread surface 1, each center block 210 (and thus each first center block 211 and each second center block 212) preferably has a hexagonal shape, as in the present embodiment.

This improves durability of the center blocks 210.

On the tread surface 1, however, each center block 210 (and thus each first center block 211 and each second center block 212) may have any polygonal shape, such as a triangular shape or a quadrilateral shape.

On the tread surface 1, each center block 210 (and thus each first center block 211 and each second center block 212) preferably has a polygonal shape (convex polygonal shape) with no concave portions, as in the present embodiment. This can improve the durability of the center blocks 210.

The number of center block sipes (sipes) 210S included in each center block 210 (and thus each first center block 211 and each second center block 212) is preferably one to five.

This ensures the rigidity of the center blocks 210 and improves drainage characteristics compared to a case in which the number of center block sipes 210S included in each center block 210 (and thus each first center block 211 and each second center block 212) is six or more.

From the same perspective, the number of center block sipes 210S included in each center block 210 (and thus each first center block 211 and each second center block 212) is preferably one to four.

From the perspective of improving drainage characteristics, the number of center block sipes 210S included in each center block 210 (and thus each first center block 211 and each second center block 212) is preferably two or more.

The number m of first center block sipes 211S included in each first center block 211 and the number n of second center block sipes 212S included in each second center block 212 preferably satisfy $$1.3 \leq n/m \leq 4.0.$$

This allows both noise reduction performance and wear resistance performance to be better achieved.

On the tread surface 1, the total length of center block sipes 210S per area in each center block 210 (and thus each first center block 211 and each second center block 212) is preferably 0.02 to 0.20 mm/mm$^2$.

This allows both traction performance and steering stability performance on dry road surfaces to be better achieved.

The area of each center block 210 on the tread surface 1 refers to an area of the outermost surface in the tire radial direction of the center block 210 in a developed view of the tread surface 1. The total length of center block sipes 210S refers to the total length of all the center block sipes 210S provided on the center block 210.

On the tread surface 1, the area of each center block 210 (and thus the area S1 of each first center block 211 and the area S2 of each second center block 212) is preferably 300 to 3000 mm², and more preferably 450 to 2500 mm².

This allows both noise reduction performance and wear resistance performance to be better achieved.

On the tread surface 1, the area S1 of each first center block 211 and the area S2 of each second center block 212 preferably satisfy $0.80 \leq S2/S1 \leq 1.25$, more preferably satisfy $0.83 \leq S2/S1 \leq 1.20$, and even more preferably satisfy $0.90 \leq S2/S1 \leq 1.10$.

By thus making the value of the area S1 of each first center block 211 and the value of the area S2 of each second center block 212 close to each other, ground contact pressure can be equalized during rolling of the tire, and thus, wear resistance performance can be further improved.

Additionally, on the tread surface 1, the area S1 of each first center block 211 and the area S2 of each second center block 212 are preferably different from each other. This allows the frequencies of noise generated during rolling of the tire to be offset from one another, and thus, noise reduction performance can be further improved. Additionally, the area S2 of each second center block 212 is preferably greater than the area S1 of each first center block 211 (that is, 1.0<S2/S1 is preferably satisfied) on the tread surface 1.

On the tread surface 1, each center block 210 (and thus each first center block 211 and each second center block 212) preferably has an aspect ratio of 20 to 50%.

This allows both noise reduction performance and wear resistance performance to be better achieved.

Herein, the "aspect ratio" of a shape refers to the ratio of the length LS in a transverse direction perpendicular to a longitudinal direction to the length LL in the longitudinal direction of the shape. In FIG. 3, the longitudinal length LL and the transverse length LS of a hexagon formed by a center block 210 are illustrated for reference. As illustrated in FIG. 3, the longitudinal direction in the hexagon formed by the center block 210 is the direction of extension of the longest diagonal line D in the hexagon.

From the same perspective, on the tread surface 1, each center block 210 (and thus each first center block 211 and each second center block 212) preferably has a length in the tire circumferential direction (the distance in the tire circumferential direction between a pair of outermost ends in the tire circumferential direction of the center block 210) that is greater than a length in the tire width direction (the distance in the tire width direction between a pair of outermost ends in the tire width direction of the center block 210).

As illustrated in FIG. 3, on the tread surface 1, each center block 210 (and thus each first center block 211 and each second center block 212) preferably forms a polygonal shape wherein the longitudinal direction is inclined with respect to the tire width direction and the tire circumferential direction. Specifically, the longitudinal direction of the polygonal shape is inclined more toward the first side CD1 in the tire circumferential direction as it extends more toward the first side WD1 in the tire width direction.

On the tread surface 1, the length in the tire circumferential direction of each second center block 212 is preferably greater than the length in the tire circumferential direction of each first center block 211.

This can further improve noise reduction performance.

Additionally, on the tread surface 1, the length in the tire width direction of each second center block 212 is preferably approximately the same as the length in the tire width direction of each first center block 211.

The number A of first center blocks 211 and the number B of second center blocks 212 preferably satisfy $0.80 \leq B/A \leq 1.25$, more preferably satisfy $0.83 \leq B/A \leq 1.20$, and even more preferably satisfy $0.90 \leq B/A \leq 1.10$.

This allows the frequencies of noise generated during rolling of the tire to be offset from one another, and thus, noise reduction performance can be improved.

Additionally, it is preferable for the first center blocks 211 and the second center blocks 212 to be alternately arranged along the tire circumferential direction as in the present embodiment. In this case, the number A of first center blocks 211 and the number B of second center blocks 212 satisfy $B/A = 1.00$.

This can further improve noise reduction performance.

In each center block 210 (and thus each first center block 211 and each second center block 212), the center block sipes 210S are preferably formed over the entire width in the tire width direction of the center block 210. In other words, the center block sipes 210S preferably open to a pair of inner main grooves 32 located adjacent to and on both sides in the tire width direction of the center block 210.

This can increase edges, and thus, both traction performance and steering stability performance on dry road surfaces can be better achieved.

As illustrated in FIG. 3, in the present embodiment, the center block sipes 210S of each center block 210 (and thus each first center block 211 and each second center block 212) include center block first sipe portions 210Sp, which open to the inner main groove 32 located adjacent to and on the second side WD2 in the tire width direction of the center block 210 and which extend more toward the first side CD1 in the tire circumferential direction as they extend more toward the first side WD1 in the tire width direction, center block second sipe portions 210Sq, which open to the inner main groove 32 located adjacent to and on the first side WD1 in the tire width direction of the center block 210 and which extend more toward the first side CD1 in the tire circumferential direction as they extend more toward the first side WD1 in the tire width direction, and center block third sipe portions 210Sr, which connect the center block first sipe portions 210Sp and the center block second sipe portions 210Sq. The center block first sipe portions 210Sp and the center block second sipe portions 210Sq are substantially parallel to each other. The center block third sipe portions 210Sr extend more toward the first side CD1 in the tire circumferential direction as they extend more toward the first side WD1 in the tire width direction, and they form an acute angle with respect to the tire width direction that is greater than those of the center block first sipe portions 210Sp and the center block second sipe portions 210Sq.

In this way, the center block first sipe portions 210Sp and the center block second sipe portions 210Sq are inclined with respect to the tire width direction and the tire radial direction, so that the center block first sipe portions 210Sp and the center block second sipe portions 210Sq are not substantially parallel to outer edges of a ground contact surface. This can improve noise reduction performance.

Furthermore, because the center block sipes 210S have a jig-zag shape due to the center block third sipe portions 210Sr, block portions divided by the center block sipes 210S in the center blocks 210 can be effectively prevented from collapsing, and thus, steering stability performance can be improved.

As illustrated in FIGS. 3 and 4, in the present embodiment, two first center block sipes 211S included in a first center block 211 have sipe depths that gradually increase as they extend away from each other in the tire width direction. More specifically, one first center block sipe 211Sa in the two first center block sipes 211S included in the first center block 211 that is located on the first side CD1 in the tire circumferential direction has a sipe depth that gradually increases as it extends toward the first side WD1 in the tire width direction. The other first center block sipe 211Sb in the two first center block sipes 211S included in the first center block 211 that is located on the second side CD2 in the tire circumferential direction has a sipe depth that gradually increases as it extends toward the second side WD2 in the tire width direction. As a result, block portions of the first center block 211 that are divided by the first center block sipes 211S can be prevented from interlocking too tightly with the road surface, and thus, wear resistance performance can be improved.

As illustrated in FIGS. 3 and 4, in the present embodiment, two second center block sipes 212Sa and 212Sc in three second center block sipes 212S included in a second center block 212 that are located on the outermost sides in the tire circumferential direction have sipe depths that gradually increase as they extend away from each other in the the tire width direction. More specifically, one second center block sipe 212Sa in the three second center block sipes 212S included in the second center block 212 that is located closest to the first side CD1 in the tire circumferential direction has a sipe depth that gradually increases as it extends toward the first side WD1 in the tire width direction. Another second center block sipe 212Sc in the three second center block sipes 212S included in the second center block 212 that is located closest to the second side CD2 in the tire circumferential direction has a sipe depth that gradually increases as it extends toward the second side WD2 in the tire width direction.

Furthermore, in the present embodiment, the other second center block sipe 212Sb in the three second center block sipes 212S included in the second center block 212 that is located in the middle in the tire circumferential direction has a sipe depth that gradually increases as it extends toward both outer sides in the tire width direction.

As illustrated in FIGS. 3 and 4, in the present embodiment, in a first center block sipe 211Sa in two first center block sipes 211S included in a first center block 211 that is located on the first side CD1 in the tire circumferential direction, the center block third sipe portion 210Sr is located closer to the first side WD1 in the tire width direction than that in a first center block sipe 211Sb in the two first center block sipes 211S that is located on the second side CD2 in the tire circumferential direction.

As illustrated in FIGS. 3 and 4, in the present embodiment, the closer a center block third sipe portion 210Sr in three second center block sipes 212S included in a second center block 212 is located to the first side CD1 in the tire circumferential direction, the closer it is located to the first side WD1 in the tire width direction.

As illustrated in FIG. 4, in the present embodiment, each first center block 211 has a pair of center block stepped side wall surfaces 213, each of which faces an inner main groove 32 and is provided with a plurality of steps. As illustrated in FIG. 3, on the tread surface 1, each center block stepped side wall surface 213 extends more toward the second side CD2 in the tire circumferential direction as it extends more toward the first side WD1 in the tire width direction.

The center block stepped side wall surfaces 213 can improve stone-biting resistance.

Additionally, in the present embodiment, respective sidewall surfaces in each first center block 211 other than the pair of center block stepped side wall surfaces 213 are flat, with no steps being provided.

Furthermore, in the present embodiment, respective side wall surfaces in each second center block 212 are flat, with no steps being provided.

Figure 5:
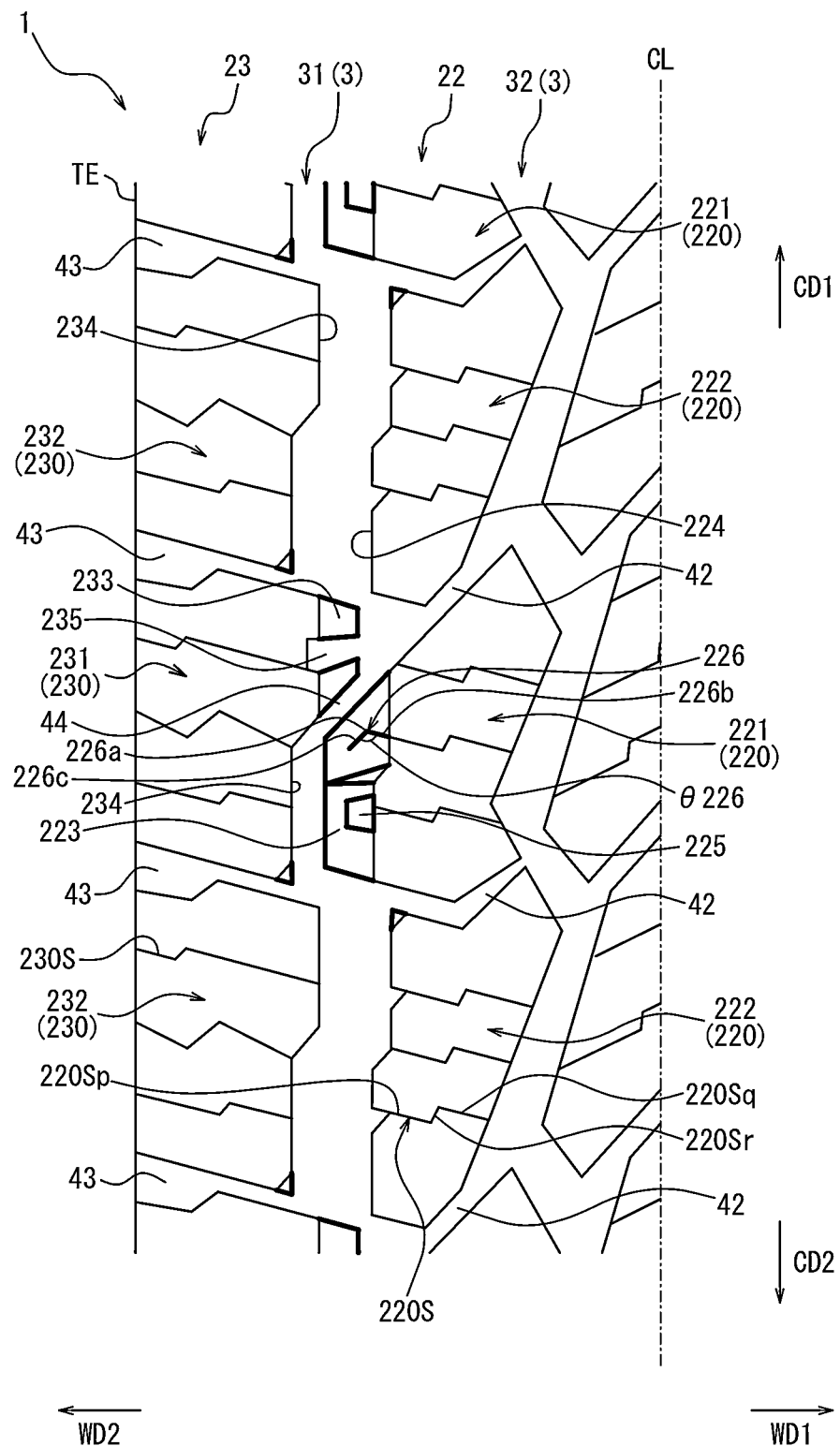
FIG. 5 is another plan view schematically illustrating part of the tread surface of FIG. 1.
Figure 6:
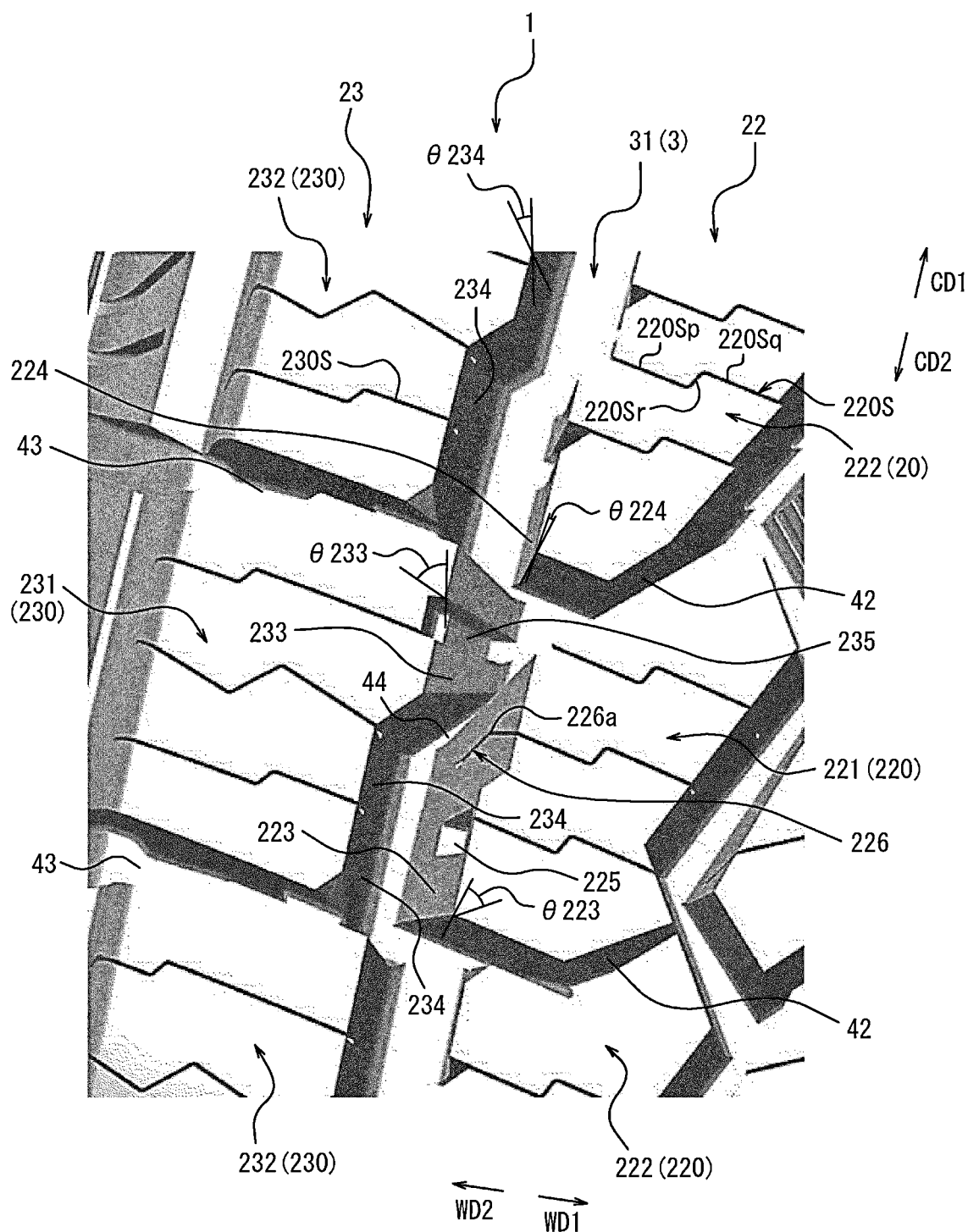
FIG. 6 is a perspective view illustrating part of the tread surface of FIG. 5 in an enlarged manner.

Next, the middle block rows 22 will be described with reference to FIGS. 1 and 2, and FIGS. 5 and 6. FIGS. 5 and 6 illustrate a middle block row 22 in an enlarged manner.

The middle block rows 22 are provided outwards in the tire width direction of the center block row 21 and inwards in the tire width direction of the shoulder block rows 23. Each middle block row 22 includes a plurality of middle blocks 220 arranged along the tire circumferential direction. The plurality of middle blocks 220 are divided by the middle lug grooves 42.

In the present embodiment, the middle block rows 22 are defined between the inner main grooves 32 and the outer main grooves 31, that is, they are located adjacent to and inwards in the tire width direction of the outer main grooves 31.

As illustrated in FIGS. 5 and 6, one or more (in the present embodiment, a plurality of) first middle blocks 221 in the plurality of middle blocks 220 constituting the middle block row 22 include a middle block inclined side wall surface 223, which faces the outer main groove 31 and which gradually inclines inwards in the tire radial direction as it extends outwards in the tire width direction. The middle block inclined side wall surface 223 preferably forms an acute angle θ223 (FIG. 6) of 30° to 50° with respect to the normal of the tread surface 1 at an inner end in the tire width direction of the middle block inclined side wall surface 223. As can be seen from comparison between FIG. 1 and FIG. 2, the middle block inclined side wall surface 223 is located inwards in the tire radial direction of the tread surface 1. It can be said that the middle block inclined side wall surface 223 extends into the outer main groove 31.

This improves traction performance on muddy ground or the like.

Furthermore, because the middle block inclined side wall surface 223 gradually inclines inwards in the tire radial direction as it extends outwards in the tire width direction, the outer main groove 31 can have a straighter shape, compared to a case in which it is parallel to the tread surface 1 so as to be included in the tread surface 1, and thus, water drainage performance can be improved.

From the same perspective, the acute angle θ223 (FIG. 6) that the middle block inclined side wall surface 223 forms with respect to the normal of the tread surface 1 at the inner end in the tire width direction of the middle block inclined side wall surface 223 is more preferably 33° to 47°.

As illustrated in FIG. 2, each outer main groove 31 extends in a substantially straight shape.

As illustrated in FIGS. 5 and 6, one or more (in the present embodiment, a plurality of) second middle blocks 222 in the plurality of middle blocks 220 constituting the middle block row 22 includes a middle block vertical side wall surface 224, which faces the outer main groove 31.

The acute angle θ223 (FIG. 6) that the middle block inclined side wall surface 223 forms with respect to the normal of the tread surface 1 at the inner end in the tire width direction of the middle block inclined side wall surface 223 is greater than the acute angle θ224 (FIG. 6) that the middle block vertical side wall surface 224 forms with respect to the normal of the tread surface 1 at an inner end in the tire width direction of the middle block vertical side wall surface 224.

In this way, because the middle block row 22 includes the first middle blocks 221, which each have a middle block inclined side wall surface 223, and the second middle blocks 222, which each have a middle block vertical side wall surface 224, a portion of the middle block row 22 that faces the outer main groove 31 is uneven. This can improve traction performance and also improve durability of the middle block row 22.

As illustrated in FIGS. 5 and 6, an outer end in the tire width direction of the middle block inclined side wall surface 223 is preferably positioned outwards in the tire width direction of an outer end in the tire width direction of the middle block vertical side wall surface 224. This allows the middle block inclined side wall surface 223 to extend further into the outer main groove 31. This can further improve traction performance. Furthermore, because the outer main groove 31 is substantially divided by the middle block inclined side wall surface 223, air column resonance can be reduced, and thus, noise reduction performance can be improved.

The acute angle θ224 (FIG. 6) that the middle block vertical side wall surface 224 forms with respect to the normal of the tread surface 1 at the inner end in the tire width direction of the middle block vertical side wall surface 224 is preferably 5° to 25°, and more preferably 10° to 20°.

This can improve drainage characteristics while ensuring the rigidity of the second middle block 222.

As illustrated in FIGS. 5 and 6, the middle block inclined side wall surface 223 preferably has a middle block recess 225. The middle block recess 225 opens to the middle block inclined side wall surface 223, and thus communicates to the outer main groove 31.

The middle block recess 225 makes it easier to grip snow and mud, thereby further improving traction performance when driving on snow or mud.

In the developed view (FIG. 5) of the tread surface 1, the length in the tire circumferential direction of the middle block recess 225 is preferably 3 to 10 mm. This can further improve traction performance when driving on snow or mud.

From the same perspective, in the developed view (FIG. 5) of the tread surface 1, the length in the tire width direction of the middle block recess 225 is preferably 3 to 10 mm.

From the same perspective, the depth in the tire radial direction of the middle block recess 225 at the deepest portion is preferably 3.4 mm or more.

Additionally, the depth in the tire radial direction of the middle block recess 225 at the deepest portion is preferably less than or equal to the groove depth of the outer main groove 31.

As illustrated in FIGS. 5 and 6, the middle block inclined side wall surface 223 preferably has a bending sipe 226. The bending sipe 226 has a bent portion 226a in the middle of extension of the bending sipe 226 on the middle block inclined side wall surface 223. In the developed views (FIGS. 1 and 5) of the tread surface 1, each bending sipe 226 is bent so as to be convex toward either side of the tire circumferential direction. As illustrated in FIG. 1, in the present embodiment, a bending sipe 226 located on the first side WD1 in the tire width direction relative to the tire equatorial plane CL is bent so as to be convex toward the second side CD2 in the tire circumferential direction, whereas a bending sipe 226 located on the second side WD2 in the tire width direction relative to the tire equatorial plane CL is bent so as to be convex toward the first side CD1 in the tire circumferential direction. The bending sipes 226 are formed on the middle block inclined side wall surfaces 223 located inwards in the tire radial direction of the tread surface 1, so that they emerge on the ground contact surface, together with the middle block inclined side wall surfaces 223, when the tire wears down.

The bending sipes 226 increase the number of sipes that emerges on the ground contact surface during wear, thereby improving snow and wet performance during wear.

In the developed views (FIGS. 1 and 5) of the tread surface 1, a portion 226c of a bending sipe 226 that extends from the bent portion 226a to an outer end in the tire width direction of the bending sipe 226 is preferably substantially parallel to an adjacent lug groove 44 that is a lug groove most adjacent to the bending sipe 226.

This improves snow and wet performance during wear.

Adjacent lug grooves 44 are defined between the middle block inclined side wall surfaces 223 and later-described shoulder block inclined side wall surfaces 233. Each adjacent lug groove 44 is located adjacent to and on either side of the tire circumferential direction of a bending sipe 226. More specifically, on the second side WD2 in the tire width direction relative to the tire equatorial plane CL, an adjacent lug groove 44 is located adjacent to and on the first side CD1 in the tire circumferential direction of a bending sipe 226. Furthermore, on the first side WD1 in the tire width direction relative to the tire equatorial plane CL, an adjacent lug groove 44 is located adjacent to and on the second side CD2 in the tire circumferential direction of a bending sipe 226.

Each adjacent lug groove 44 extends outwards in the tire width direction continuously from an outer end in the tire width direction of a corresponding one of the middle lug grooves 42.

In the developed view (FIG. 5) of the tread surface 1, the central angle θ226 of the bending sipe 226 is preferably 100° to 160°, and more preferably 114° to 141°.

This improves snow and wet performance during wear.

In the developed view (FIG. 5) of the tread surface 1, the groove width of the adjacent lug groove 44 is preferably 3.5 mm or less.

By thus narrowing the adjacent lug groove 44, noise reduction performance can be improved, and stone-biting resistance and mud-shedding performance can also be improved.

Additionally, in the developed view (FIG. 5) of the tread surface 1, the groove width of the adjacent lug groove 44 is preferably 2.0 mm or more.

The adjacent lug groove 44 preferably extends more toward the first side CD1 in the tire circumferential direction as it extends more toward the first side WD1 in the tire width direction, as in the present embodiment.

This can improve stone-biting resistance and noise reduction performance.

The adjacent lug groove 44 forms an acute angle of preferably 20° to 50°, and more preferably 24° to 46°, with respect to the tire width direction.

This can improve stone-biting resistance and noise reduction performance.

As in the present embodiment, the first middle blocks 221 and the second middle blocks 222 preferably have different shapes on the tread surface 1. Here, the shape formed by each middle block 220 (each first middle block 221, each second middle block 222, or the like) on the tread surface 1 refers to a shape formed by the outermost surface in the tire radial direction of the middle block 220 in a developed view of the tread surface 1. Having "different shapes" means that they are non-congruent and dis similar.

The shapes formed by the respective first middle blocks 221 on the tread surface 1 may be congruent, or they may differ from each other only in terms of dimension in the tire circumferential direction. Similarly, the shapes formed by the respective second middle blocks 222 on the tread surface 1 may be congruent, or they may differ from each other only in terms of dimension in the tire circumferential dimension.

According to the present embodiment, because the first middle blocks 221 and the second middle blocks 222 have different shapes, the frequencies of noise generated during rolling of the tire can be offset from one another compared to a case in which they have the same shape, and thus, noise reduction performance can be improved.

On the tread surface 1, the area S3 of each first middle block and the area S4 of each second middle block preferably satisfy $$0.9 \leq S4/S3 \leq 1.1.$$

By thus making the value of the first middle block 221 and the value of the second middle block 222 close to each other, ground contact pressure can be equalized during rolling of the tire, and thus, wear resistance performance can be further improved.

As in the present embodiment, it is preferable for each first middle block 221 and each second middle block 222 to have polygonal shapes on the tread surface 1. This makes it easier to arrange the middle blocks 220 in the middle block row 22 at equal spacing, compared to a case in which they have non-polygonal shapes, such as circular shapes. This can equalize ground contact pressure during rolling of the tire, and thus, wear resistance performance can be improved.

In the present embodiment, the first middle blocks 221 and the second middle blocks 222 are arranged alternately along the tire circumferential direction.

As illustrated in FIG. 1, the first middle blocks 221 and the second center blocks 212 face each other in the tire width direction. The second middle blocks 222 and the first center blocks 211 face each other in the tire width direction.

As illustrated in FIGS. 5 and 6, in the present embodiment, each middle block 220 (and thus each first middle block 221 and each second middle block 222) includes one or more middle block sipes (sipes) 220S.

According to the present embodiment, because each middle block 220 (and thus each first middle block 221 and each second middle block 222) includes one or more middle block sipes (sipes) 220S, edges can be increased compared to a case in which it does not have sipes, and thus, both traction performance and steering stability performance on dry road surfaces can be better achieved.

In the present embodiment, a plurality of middle block sipes 220S are arranged along the tire circumferential direction in each middle block 220 (and thus each first middle block 221 and each second middle block 222). Each middle block 220 (and thus each first middle block 221 and each second middle block 222) has the same number of middle block sipes 220S. In the present embodiment, the number of middle block sipes 220S included in each middle block 220 (and thus each first middle block 221 and each second middle block 222) is three.

As illustrated in FIG. 5, in the present embodiment, the middle block sipes 220S of each middle block 220 (and thus, each first middle block 221 and each second middle block 222) include middle block first sipe portions 220Sp, which open to the outer main groove 31 located adjacent to and outwards in the tire width direction of the middle block 220 and which extend inwards in the tire width direction and terminate within the middle block 220, middle block second sipe portions 220Sq, which open to the inner main groove 32 located adjacent to and inwards in the tire width direction of the middle block 220 and which extend outwards in the tire width direction and terminate within the middle block 220, and middle block third sipe portions 220Sr, which connect the middle block first sipe portions 220Sp and the middle block second sipe portions 220Sq. The middle block first sipe portions 220Sp and the middle block second sipe portions 220Sq are substantially parallel to each other. The middle block first sipe portions 220Sp and the middle block second sipe portions 220Sq extend more toward the second side CD2 in the tire circumferential direction as they extend more toward the first side WD1 in the tire width direction. The middle block third sipe portions 220Sr extend more toward the first side CD1 in the tire circumferential direction as they extend more toward the first side WD1 in the tire width direction.

In this way, the middle block first sipe portions 220Sp and the middle block second sipe portions 220Sq are inclined with respect to the tire width direction and the tire radial direction, so that the middle block first sipe portions 220Sp and the middle block second sipe portions 220Sq are not parallel to outer edges of the ground contact surface. This can improve noise reduction performance.

Furthermore, because the middle block sipes 220S have a jig-zag shape due to the middle block third sipe portions 220Sr, block portions of the middle block 220 that are divided by the middle block sipes 220S can be effectively prevented from collapsing, and thus, steering stability performance can be improved.

As illustrated in FIGS. 1 and 5, in the present embodiment, the middle block recess 225 in each first middle block 221 communicates to one of the one or more middle block sipes 220S included in the first middle block 221. Specifically, in a first middle block 221 of a middle block row 22 that is located on the second side WD2 in the tire width direction relative to the tire equatorial plane CL, the middle block recess 225 communicates to a middle block sipe 220S in three middle block sipes 220S included in the first middle block 221 that is located closest to the second side CD2 in the tire circumferential direction. Furthermore, in a first middle block 221 of a middle block row 22 that is located on the first side WD1 in the tire width direction relative to the tire equatorial plane CL, the middle block recess 225 communicates to a middle block sipe 220S in three middle block sipes 220S included in the first middle block 221 that is located closest to the first side CD1 in the tire circumferential direction.

In the present embodiment, an outer end in the tire width direction of each middle block recess 225 is located inwards in the tire width direction of the outer end in the tire width direction of the middle block inclined side wall surface 223.

As illustrated in FIGS. 1 and 5, in the present embodiment, the bending sipe 226 in each first middle block 221 communicates to one of the one or more middle block sipes 220S included in the first middle block 221. Specifically, in each first middle block 221, the bending sipe 226 communicates to a middle block sipe 220S in the three middle block sipes 220S included in the first middle block 221 that is located in the middle in the tire circumferential direction.

As illustrated in FIG. 5, in the developed view of the tread surface 1, a portion 226b of the bending sipe 226 that extends from the bent portion 226a to an inner end in the tire width direction of the bending sipe 226 is substantially parallel to the middle block first sipe portion 220Sp of each middle block sipe 220S.

In the present embodiment, the outer end in the tire width direction of the bending sipe 226 is located inwards in the tire width direction of the outer end in the tire width direction of the middle block inclined side wall surface 223.

Next, the shoulder block rows 23 will be described with reference to FIGS. 1 and 2, and FIGS. 5 and 6. FIGS. 5 and 6 illustrate a shoulder block row 23 in an enlarged manner.

The shoulder block rows 23 are defined between the ground contact ends TE and the outer main grooves 31. That is, the shoulder block rows 23 are located adjacent to and outwards in the tire width direction of the pair of outer main grooves 31. Each shoulder block row 23 includes a plurality of shoulder blocks 230 arranged along the tire circumferential direction. The plurality of shoulder blocks 230 are divided by shoulder lug grooves 43.

As illustrated in FIGS. 5 and 6, one or more (in the present embodiment, a plurality of) first shoulder blocks 231 in the plurality of shoulder blocks 230 constituting the shoulder block row 23 include a shoulder block inclined side wall surface 233, which faces the outer main groove 31 and which gradually inclines inwards in the tire radial direction as it extends inwards in the tire width direction. The shoulder block inclined side wall surface 233 preferably forms an acute angle θ233 (FIG. 6) of 30° to 50° with respect to the normal of the tread surface 1 at an outer end in the tire width direction of the shoulder block inclined side wall surface 233. As can be seen from comparison between FIG. 1 and FIG. 2, the shoulder block inclined side wall surface 233 is located inwards in the tire radial direction of the tread surface 1. It can be said that the shoulder block inclined side wall surface 233 extends into the outer main groove 31.

This improves traction performance on muddy ground or the like.

Furthermore, because the shoulder block inclined side wall surface 233 gradually inclines inwards in the tire radial direction as it extends inwards in the tire width direction, the outer main groove 31 can have a straighter shape, compared to a case in which it is parallel to the tread surface 1 so as to be included in the tread surface 1, and thus, water drainage performance can be improved.

From the same perspective, the acute angle θ233 (FIG. 6) that the shoulder block inclined side wall surface 233 forms with respect to the normal of the tread surface 1 at the outer end in the tire width direction of the shoulder block inclined side wall surface 233 is more preferably 33° to 47°.

As illustrated in FIGS. 5 and 6, one or more (in the present embodiment, a plurality of) second shoulder blocks 232 in the plurality of shoulder blocks 230 constituting the shoulder block row 23 include a shoulder block vertical side wall surface 234, which faces the outer main groove 31.

The acute angle θ233 (FIG. 6) that the shoulder block inclined side wall surface 233 forms with respect to the normal of the tread surface 1 at the outer end in the tire width direction of the shoulder block inclined side wall surface 233 is greater than the acute angle θ234 (FIG. 6) that the shoulder block vertical side wall surface 234 forms with respect to the normal of the tread surface 1 at the outer end in the tire width direction of the shoulder block vertical side wall surface 234.

In this way, because the shoulder block row 23 includes the first shoulder blocks 231, which each has a shoulder block inclined side wall surface 233, and the second shoulder blocks 232, which each has a shoulder block vertical side wall surface 234, a portion of the shoulder block row 23 that faces the outer main groove 31 is uneven. This can improve traction performance and also improve durability of the shoulder block row 23.

In the present embodiment, each first shoulder block 231 has a shoulder block vertical side wall surface 234, in addition to a shoulder block inclined side wall surface 233. The shoulder block vertical side wall surface 234 of each first shoulder block 231 faces the corresponding middle block inclined side wall surface 223 in the tire width direction.

Each second shoulder block 232 does not have a shoulder block inclined side wall surface 233.

As illustrated in FIGS. 5 and 6, an inner end in the tire width direction of the shoulder block inclined side wall surface 233 is preferably located inwards in the tire width direction of an inner end in the tire width direction of the shoulder block vertical side wall surface 234. This allows the shoulder block inclined side wall surface 233 to extend further into the outer main groove 31. This can further improve traction performance. Furthermore, because the outer main groove 31 is substantially divided by the shoulder block inclined side wall surface 233, air column resonance can be reduced, and thus, noise reduction performance can be improved.

The acute angle θ234 (FIG. 6) that the shoulder block vertical side wall surface 234 forms with respect to the normal of the tread surface 1 at the outer end in the tire width direction of the shoulder block vertical side wall surface 234 is preferably 5° to 25°, and more preferably 10° to 20°.

This can improve drainage characteristics while ensuring the rigidity of the shoulder block 230.

As illustrated in FIGS. 5 and 6, the shoulder block inclined side wall surface 233 preferably has a shoulder block recess 235. The shoulder block recess 235 opens to the shoulder block inclined side wall surface 233, and thus communicates to the outer main groove 31.

The shoulder block recess 235 makes it easier to grip snow and mud, thereby further improving traction performance when driving on snow or mud.

In the developed view (FIG. 5) of the tread surface 1, the length in the tire circumferential direction of the shoulder block recess 235 is preferably 3 to 10 mm. This can further improve traction performance when driving on snow or mud.

From the same perspective, in the developed view (FIG. 5) of the tread surface 1, the length in the tire width direction of the shoulder block recess 235 is preferably 3 to 10 mm.

From the same perspective, the depth in the tire radial direction of the shoulder block recess 235 at the deepest portion is preferably 3.4 mm or more.

Additionally, the depth in the tire radial direction of the shoulder block recess 235 at the deepest portion is preferably less than or equal to the groove depth of the outer main groove 31.

In the present embodiment, the first shoulder blocks 231 and the second shoulder blocks 232 are arranged alternately along the tire circumferential direction.

The first middles block 221 and the first shoulder blocks 231 face each other in the tire width direction. The second middle blocks 222 and the second shoulder blocks 232 face each other in the tire width direction.

In the present embodiment, each shoulder block 230 (and thus each first shoulder block 231 and each second shoulder block 232) includes one or more shoulder block sipes (sipes) 230S.

According to the present embodiment, because each shoulder block 230 (and thus each first shoulder block 231 and each second shoulder block 232) includes one or more shoulder block sipes (sipes) 230S, edges can be increased compared to a case in which it does not have sipes, and thus, both traction performance and steering stability performance on dry road surfaces can be better achieved.

In the present embodiment, a plurality of shoulder block sipes 230S are arranged along the tire circumferential direction in each shoulder block 230 (and thus each first shoulder block 231 and each second shoulder block 232). Each shoulder block 230 (and thus each first shoulder block 231 and each second shoulder block 232) has the same number of shoulder block sipes 230S. In the present embodiment, the number of shoulder block sipes 230S included in each shoulder block 230 (and thus each first shoulder block 231 and each second shoulder block 232) is three.

As illustrated in FIGS. 1 and 5, in the present embodiment, the shoulder block recess 235 in each first shoulder block 231 communicates to one of the one or more shoulder block sipes 230S included in the first shoulder block 231. Specifically, in a first shoulder block 231 of a shoulder block row 23 that is located on the second side WD2 in the tire width direction relative to the tire equatorial plane CL, the shoulder block recess 235 communicates to a shoulder block sipe 230S in three shoulder block sipes 230S included in the first shoulder block 231 that is located closest to the first side CD1 in the tire circumferential direction. Furthermore, in a first shoulder block 231 of a shoulder block row 23 that is located on the first side WD1 in the tire width direction relative to the tire equatorial plane CL, the shoulder block recess 235 communicates to a shoulder block sipe 230S in three shoulder block sipes 230S included in the first shoulder block 231 that is located closest to the second side CD2 in the tire circumferential direction.

In the present embodiment, an inner end in the tire width direction of the shoulder block recess 235 is located at the inner end in the tire width direction of the shoulder block inclined side wall surface 233.

INDUSTRIAL APPLICABILITY

The pneumatic tire according to the present disclosure can be used as any type of pneumatic tire, and it can be suitably used as a pneumatic tire for passenger vehicles, and more suitably used as a pneumatic tire for all-season passenger vehicles.

REFERENCE SIGNS LIST

1 Tread surface
21 Center block row
210 Center block
211 First center block
212 Second center block
213 Center block stepped side wall surface
22 Middle block row
220 Middle block
221 First middle block
222 Second middle block
223 Middle block inclined side wall surface
224 Middle block vertical side wall surface
225 Middle block recess
226 Bending sipe
226a Bent portion
226b Portion extending from bent portion to inner end in tire width direction
226c Portion extending from bent portion to outer end in tire width direction
23 Shoulder block row
230 Shoulder block
231 First shoulder block
232 Second shoulder block
233 Shoulder block inclined side wall surface
234 Shoulder block vertical side wall surface
235 Shoulder block recess
210S Center block sipe (sipe)
211S First center block sipe
212S Second center block sipe
210Sp Center block first sipe portion
210Sq Center block second sipe portion
210Sr Center block third sipe portion
220S Middle block sipe (sipe)
220Sp Middle block first sipe portion
220Sq Middle block second sipe portion
220Sr Middle block third sipe portion
230S Shoulder block sipe (sipe)
3 Main groove
31 Outer main groove
32 Inner main groove
41 Center lateral groove
42 Middle lug groove (lug groove)
43 Shoulder lug groove (lug groove)
44 Adjacent lug groove (lug groove)
TE Ground contact end
CD1 First side in tire circumferential direction
CD2 Second side in tire circumferential direction
CL Tire equatorial plane

The invention claimed is:

1. A pneumatic tire comprising
a tread surface including:
two or more main grooves; and
a pair of middle block rows located adjacent to and inwards in a tire width direction of a pair of outer main grooves in the two or more main grooves that are positioned on outermost sides in the tire width direction, wherein
each middle block row in the pair of middle block rows includes a plurality of middle blocks arranged along a tire circumferential direction,
one or more first middle blocks in the plurality of middle blocks each have a middle block inclined side wall surface that faces an outer main groove in the pair of outer main grooves and that gradually inclines inwards in a tire radial direction as the middle block inclined side wall surface extends outwards in the tire width direction,
the middle block inclined side wall surface forms an acute angle of 30° to 50° with respect to a normal of the tread surface at an inner end in the tire width direction of the middle block inclined side wall surface, one or more second middle blocks in the plurality of middle blocks each have a middle block vertical side wall surface that faces an outer main groove in the pair of outer main grooves, the acute angle that the middle block inclined side wall surface forms with respect to the normal of the tread surface at the inner end in the tire width direction of the middle block inclined side wall surface is greater than an acute angle that the middle block vertical side wall surface forms with respect to the normal of the tread surface at an inner end in the tire width direction of the middle block vertical side wall surface, and an outer end in the tire width direction of the middle block inclined side wall surface is positioned outwards in the tire width direction of an outer end in the tire width direction of the middle block vertical side wall surface.

2. The pneumatic tire according to claim 1, wherein the tread surface further includes a pair of shoulder block rows located adjacent to and outwards in the tire width direction of the pair of outer main grooves, each shoulder block row in the pair of shoulder block rows includes a plurality of shoulder blocks arranged along the tire circumferential direction, one or more first shoulder blocks in the plurality of shoulder blocks each have a shoulder block inclined side wall surface that faces an outer main groove in the pair of outer main grooves and that gradually inclines inwards in the tire radial direction as the shoulder block inclined side wall surface extends inwards in the tire width direction, and the shoulder block inclined side wall surface forms an acute angle of 30° to 50° with respect to the normal of the tread surface at an outer end in the tire width direction of the shoulder block inclined side wall surface.

3. The pneumatic tire according to claim 2, wherein the shoulder block inclined side wall surface has a shoulder block recess.

4. The pneumatic tire according to claim 1, wherein the middle block inclined side wall surface has a middle block recess.

5. The pneumatic tire according to claim 4, wherein the middle block inclined side wall surface has a bending sipe, and the bending sipe has a bent portion provided in a middle of extension of the bending sipe on the middle block inclined side wall surface.

6. The pneumatic tire according to claim 4, wherein the tread surface further includes a pair of shoulder block rows located adjacent to and outwards in the tire width direction of the pair of outer main grooves, each shoulder block row in the pair of shoulder block rows includes a plurality of shoulder blocks arranged along the tire circumferential direction, one or more first shoulder blocks in the plurality of shoulder blocks each have a shoulder block inclined side wall surface that faces an outer main groove in the pair of outer main grooves and that gradually inclines inwards in the tire radial direction as the shoulder block inclined side wall surface extends inwards in the tire width direction, and the shoulder block inclined side wall surface forms an acute angle of 30° to 50° with respect to the normal of the tread surface at an outer end in the tire width direction of the shoulder block inclined side wall surface.

7. The pneumatic tire according to claim 1, wherein the acute angle that the middle block vertical side wall surface forms with respect to the normal of the tread surface at the inner end in the tire width direction of the middle block vertical side wall surface is 5° to 25°.

8. The pneumatic tire according to claim 7, wherein the first middle blocks and the second middle blocks have different shapes on the tread surface, and an area S3 of each first middle block and an area S4 of each second middle block satisfy $$0.9 \leq S4/S3 \leq 1.1.$$

9. The pneumatic tire according to claim 7, wherein the middle block inclined side wall surface has a middle block recess.

10. The pneumatic tire according to claim 7, wherein the middle block inclined side wall surface has a bending sipe, and the bending sipe has a bent portion provided in a middle of extension of the bending sipe on the middle block inclined side wall surface.

11. The pneumatic tire according to claim 7, wherein the tread surface further includes a pair of shoulder block rows located adjacent to and outwards in the tire width direction of the pair of outer main grooves, each shoulder block row in the pair of shoulder block rows includes a plurality of shoulder blocks arranged along the tire circumferential direction, one or more first shoulder blocks in the plurality of shoulder blocks each have a shoulder block inclined side wall surface that faces an outer main groove in the pair of outer main grooves and that gradually inclines inwards in the tire radial direction as the shoulder block inclined side wall surface extends inwards in the tire width direction, and the shoulder block inclined side wall surface forms an acute angle of 30° to 50° with respect to the normal of the tread surface at an outer end in the tire width direction of the shoulder block inclined side wall surface.

12. The pneumatic tire according to claim 1, wherein the middle block inclined side wall surface has a bending sipe, and the bending sipe has a bent portion provided in a middle of extension of the bending sipe on the middle block inclined side wall surface.

13. The pneumatic tire according to claim 12, wherein the tread surface further includes a pair of shoulder block rows located adjacent to and outwards in the tire width direction of the pair of outer main grooves, each shoulder block row in the pair of shoulder block rows includes a plurality of shoulder blocks arranged along the tire circumferential direction, one or more first shoulder blocks in the plurality of shoulder blocks each have a shoulder block inclined side wall surface that faces an outer main groove in the pair of outer main grooves and that gradually inclines inwards in the tire radial direction as the shoulder block inclined side wall surface extends inwards in the tire width direction, and the shoulder block inclined side wall surface forms an acute angle of 30° to 50° with respect to the normal of the tread surface at an outer end in the tire width direction of the shoulder block inclined side wall surface.

14. The pneumatic tire according to claim 12, wherein, in a developed view of the tread surface, a portion of the bending sipe that extends from the bent portion to an outer end in the tire width direction of the bending sipe is substantially parallel to an adjacent lug groove that is a lug groove most adjacent to the bending sipe.

15. The pneumatic tire according to claim 14, wherein the adjacent lug groove forms an acute angle of 20° to 50° with respect to the tire width direction.

16. The pneumatic tire according to claim 14, wherein
the tread surface further includes a pair of shoulder block rows located adjacent to and outwards in the tire width direction of the pair of outer main grooves,
each shoulder block row in the pair of shoulder block rows includes a plurality of shoulder blocks arranged along the tire circumferential direction,
one or more first shoulder blocks in the plurality of shoulder blocks each have a shoulder block inclined side wall surface that faces an outer main groove in the pair of outer main grooves and that gradually inclines inwards in the tire radial direction as the shoulder block inclined side wall surface extends inwards in the tire width direction, and
the shoulder block inclined side wall surface forms an acute angle of 30° to 50° with respect to the normal of the tread surface at an outer end in the tire width direction of the shoulder block inclined side wall surface.

* * * * *